(12) United States Patent
Gower et al.

(10) Patent No.: US 8,549,233 B2
(45) Date of Patent: *Oct. 1, 2013

(54) MANAGING SHARED DATA OBJECTS TO PROVIDE VISIBILITY TO SHARED MEMORY

(71) Applicant: International Business Machines Corporation, Armonk, NY (US)

(72) Inventors: Barry P. Gower, Poughkeepsie, NY (US); Daniel S. Gritter, Wappingers Falls, NY (US); Colette A. Manoni, Brewster, NY (US); Matthew J. Sykes, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,787

(22) Filed: Nov. 5, 2012

(65) Prior Publication Data
US 2013/0061241 A1    Mar. 7, 2013

Related U.S. Application Data

(63) Continuation of application No. 12/979,505, filed on Dec. 28, 2010.

(51) Int. Cl.
*G06F 12/00* (2006.01)

(52) U.S. Cl.
USPC .......................... 711/147; 711/156; 711/170

(58) Field of Classification Search
None
See application file for complete search history.

(56) References Cited

U.S. PATENT DOCUMENTS 7,213,098 B2    5/2007   Czajkowski et al.
2006/0277268 A1*  12/2006  Everhart ...................... 709/217

* cited by examiner

*Primary Examiner* — Shawn X Gu
(74) *Attorney, Agent, or Firm* — Cantor Colburn LLP; Steven Chiu

(57) ABSTRACT

Managing shared data objects to share data between computer processes, including a method for executing a plurality of independent processes on an application server, the processes including a first process and a second process. A shared memory utilized by the plurality of independent processes is provided. A single copy of the data and metadata are stored in the shared memory. The metadata includes an address of the data. The first process initiates the storing of the data in the shared memory. An address of the metadata is transferred from the first process to the second process to notify the second process about the data. The second process determines the address of the shared memory by reading the metadata. The data in the shared memory is accessed by the second process.

9 Claims, 8 Drawing Sheets

MANAGING SHARED DATA OBJECTS TO PROVIDE VISIBILITY TO SHARED MEMORY

CROSS-REFERENCE TO RELATED APPLICATION

This application is a continuation of U.S. patent application Ser. No. 12/979,505, filed Dec. 28, 2010, the content of which is hereby incorporated by reference in its entirety.

BACKGROUND

The present invention relates to shared memory, and more specifically, to managing shared data objects to provide visibility to shared memory between separate processes running the same processor.

Java is an example of a platform independent programming language that is used to build enterprise-level applications. With WebSphere Application Server for z/Series, a logical application server can be made up of multiple Java virtual machines (JVMs), each executing in a different address space. These address spaces are called servant regions (SRs), each containing one JVM. If a SR abends, another SR can take over the incoming requests in a multiple SR environment.

WebSphere Application server for z/Series distributed environment concepts to create and manage application servers. Each application server includes multiple address spaces that represent a single logical application server. At a minimum, one application server includes one control region (CR) and one SR. Additional SRs can be added, with the number of SRs limited by the physical memory available on the system. The main responsibility of the CR is to handle the incoming connections from the clients and dispatch the request to the SRs. The SR is the component of an application server where the actual application runs and transactions are processed in a JVM.

Currently in WebSphere for z/Series, a request is received from a client application by the CR and passed to the CR for processing. Upon processing of the request, a response is sent back to the CR for output to the client application. During the course of this processing several copies of data need to be made. When information is passed from the CR to the SR, a physical copy is made to allow visibility of the request to the SR. Similarly, on the response path the response is copied from the SR to the CR in order to allow the CR to have visibility to the response.

SUMMARY

An embodiment includes a method for sharing data between computer processes. The method includes executing a plurality of independent processes on an application server, the processes including a first process and a second process. A shared memory utilized by the plurality of independent processes is provided. A single copy of the data and metadata are stored in the shared memory. The metadata includes an address of the data. The first process initiates the storing of the data in the shared memory. An address of the metadata is transferred from the first process to the second process to notify the second process about the data. The second process determines the address of the shared memory by reading the metadata. The data in the shared memory is accessed by the second process.

Additional features and advantages are realized through the techniques of the present invention.

Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment provides visibility to shared memory between separate regions (or separate processes) executing on the same processor. In an embodiment, two regions, such as a control region (CR) and a servant region (SR) create shared memory objects (SMOs) for storing buffers (e.g., Java direct byte buffers). The created buffers are used for pointing to locations of data that is shared between the two regions. In an embodiment, a buffer pointing to a shared memory space storing data is created in one region (e.g., a Java virtual machine or "JVM") of an application server. The data is shared with the second region by communicating the address of the buffer to the second region (or JVM) of the application server. The second region then creates a second buffer for storing the pointer to the shared memory space that stores the data. The second region accesses the data in the shared memory space via the second buffer. Embodiments described herein avoid the extra storage overhead of maintaining two copies of the data. In addition, embodiments avoid the processing expense of copying the information.

Embodiments are described herein in terms of Java and WebSphere for z/Series as example environments. It will be appreciated by those skilled in the art, that embodiments are not limited to Java and WebSphere for z/Series, and that embodiments apply to any platform independent software code environment that implements data sharing between multiple regions (or multiple processes) executing on the same processor.

Figure 1:
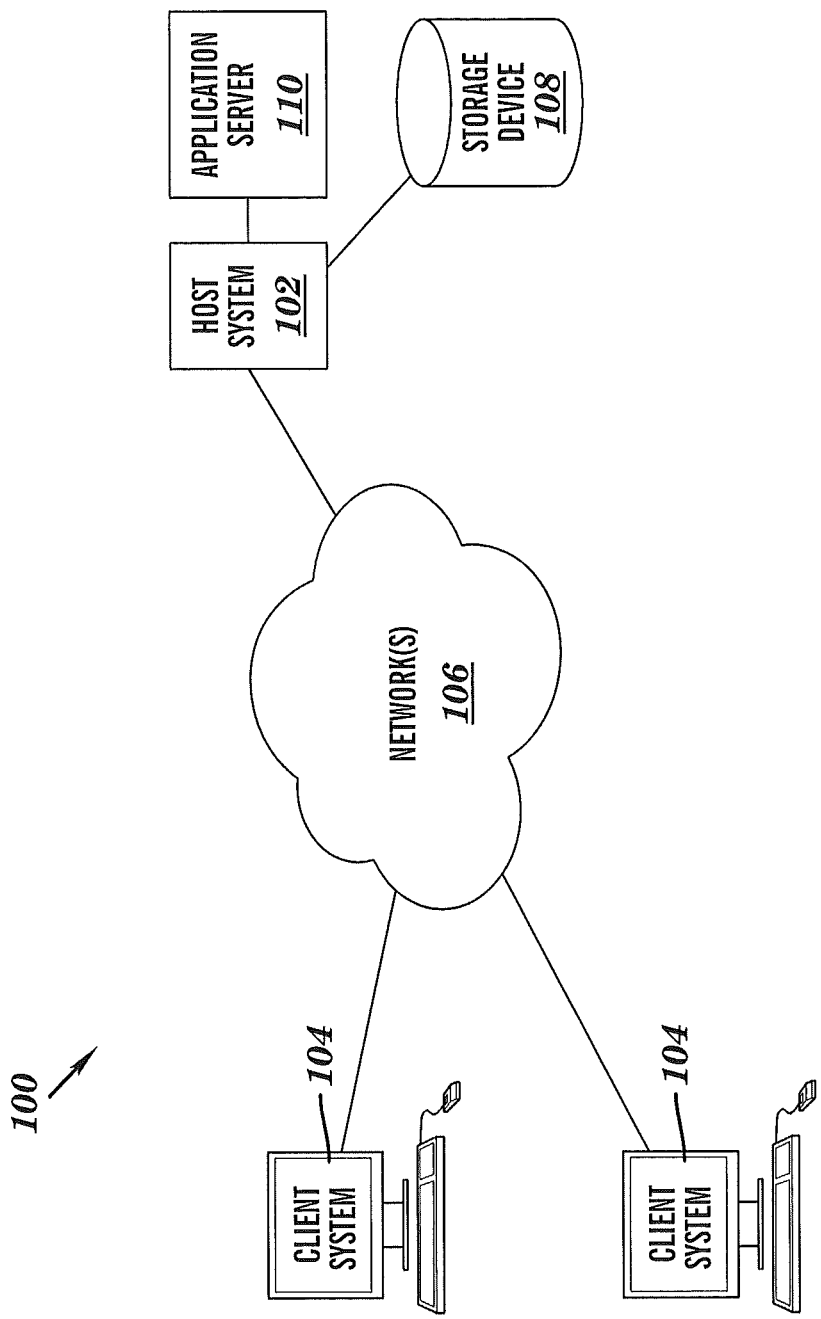
FIG. 1 illustrates a computing system for implementing shared address spaces in accordance with an embodiment.

Turning now to FIG. 1, a block diagram of a system 100 upon which the processes to provide visibility to shared data may be implemented in accordance with an embodiment will now be described. The system 100 of FIG. 1 includes a host system 102 in communication with client systems 104 via one or more network(s) 106. Host system 102 may be implemented using one or more servers operating in response to a computer program stored in a storage medium accessible by the server(s). The host system 102 may operate as a network server (e.g., a web server) to communicate with one or more client systems 104. The host system 102 may handle sending and receiving information to and from client systems 104 and may perform associated tasks.

The host system 102 also operates as an application server 110. In accordance with an embodiment, the host system 102 executes one or more computer programs to provide a Java application server for executing one or more processes. These one or more computer programs are referred to collectively herein as an application server 110. Alternatively, a portion of the functionality of the application server 110 may be implemented via the client systems 104.

Application server activities may be shared by the client systems 104 and the host system 102 by providing an application (e.g., java applet) to the client systems 104. Alternatively, client systems 104 may include stand-alone software applications for performing a portion of the processing described herein. In yet further embodiments, the application sever functions may be built in to a web browser application executing on the client systems 104 (not shown).

As previously described, it is understood that separate servers may be utilized to implement the network server functions. Alternatively, the network server may be implemented by a single server executing computer programs to perform the requisite functions described with respect to host system 102.

Client systems 104 may be coupled to host system 102 via one or more network(s) 106. Each of the client systems 104 may be implemented using a general-purpose computer executing a computer program for carrying out some of the processes described herein. The client systems 104 may be personal computers (e.g., a lap top, a personal digital assistant) or host-attached terminals. For purposes of illustration, client systems 104 are operated by end users executing programs that generate requests that are received at the application server 110. In addition, the programs may also receive responses generated by processes executing on the application server 110.

In exemplary embodiments, the system 100 shown in FIG. 1 includes a storage device 108. Storage device 108 is in communication with host system 102 and may be implemented using a variety of devices for storing electronic information. It is understood that the storage device 108 may be implemented using memory contained in the host system 102 or it may be a separate physical device, e.g., as shown in FIG. 1. The storage device 108 is logically addressable as a consolidated data source across a distributed environment that includes network(s) 106. Information stored in the storage device 108 may be retrieved and manipulated via the host system 102 and authorized users of client systems 104. The storage device 108 may house shared data objects (e.g., request shared memory objects, response shared memory objects, and memory block shared memory objects), as well as application data for applications executing on the host system 102, among other information desired by the service provider of host system 102. These features are described further herein. In an exemplary embodiment, the host system 102 operates as a database server and coordinates access to application data including data stored on storage device 108.

Network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. Client systems 104 may be coupled to the host system 102 through multiple networks (e.g., intranet and Internet) so that not all client systems 104 are coupled to the host system 102 through the same network. One or more of the client systems 104 and the host system 102 may be connected to the network(s) 106 in a wireless fashion.

Figure 2:
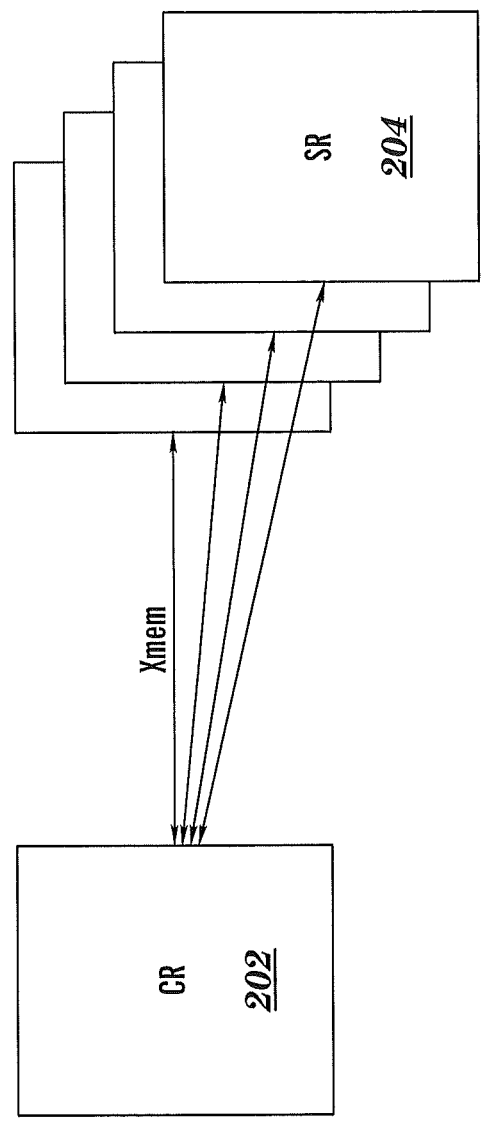
FIG. 2 illustrates an application server in accordance with an embodiment.

FIG. 2 illustrates application server 110 in accordance with an embodiment that supports a WebSphere for z/Series environment. The application server 110 shown in FIG. 2 is executing one control region (CR) 202 and four servant regions (SRs) 204. The CR 202 is in communication with each SR 204 via a cross memory channel. The cross memory channel is utilized to transfer requests and responses between the CR 202 and the SRs 204.

As used herein, the term "shared memory object" or "SMO" refers to memory accessible by two or more regions executing on an application server. Data stored in an SMO may be written to and read from by two or more processes executing in different regions on the application server.

Figure 3:
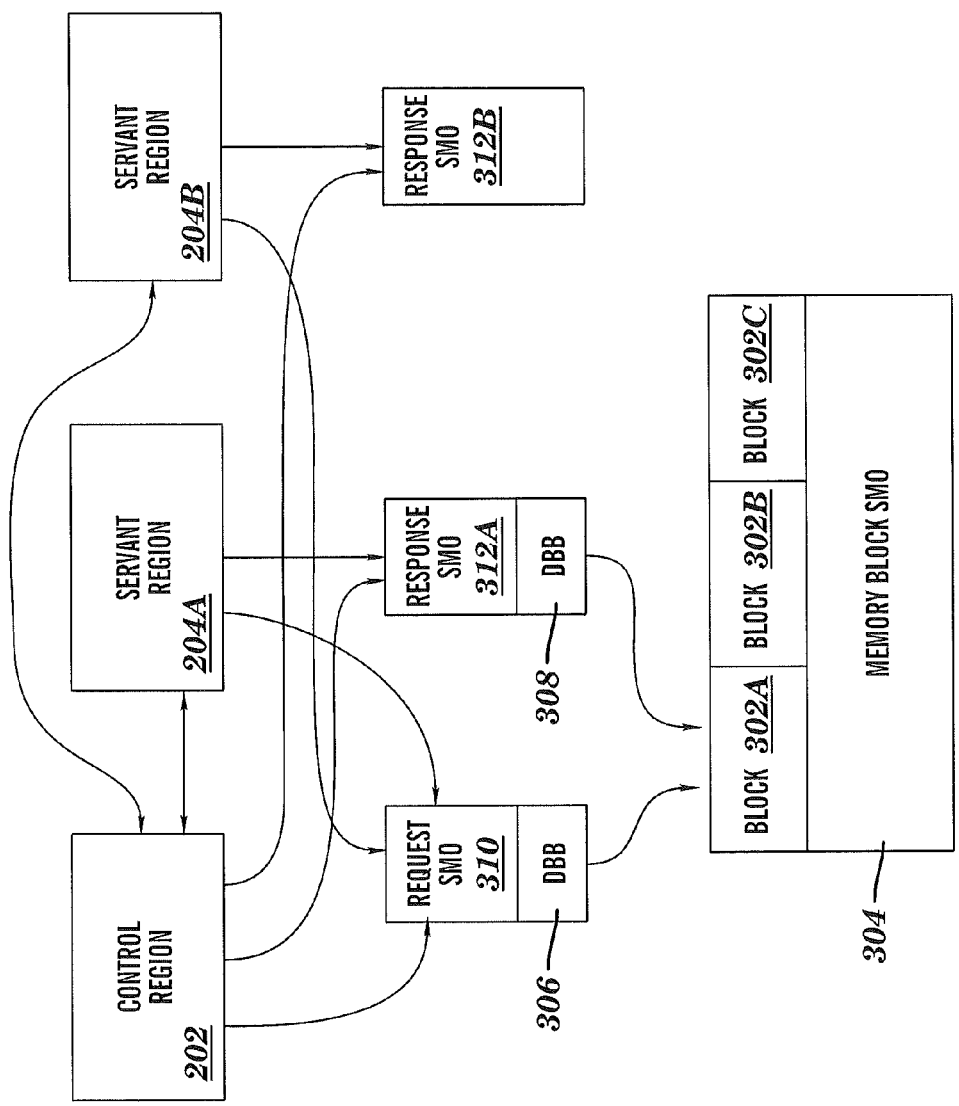
FIG. 3 illustrates a more detailed view of one embodiment of the application server of FIG. 2.

FIG. 3 illustrates a more detailed view of an embodiment of the application server of FIG. 2. The embodiment shown in FIG. 2 includes one CR 202, two SRs 204, one request shared memory object (SMO) 310, two response SMOs 312 (one for each SR 204) and one memory block SMO 304. As used herein, the term "memory block" refers to one or more memory cells in a memory that are accessed as a unit. The size and physical location of the memory cells that make up a block can vary and are implementation specific. As shown in FIG. 3, the CR 202 is in communication with the SRs 204 via a cross memory channel (Xmem). In addition, the CR 202 includes pointers to (e.g., an address) to the request SMO 310 and to the two response SMOs 312. As shown in FIG. 3, the request SMO 310 includes one allocated direct byte buffer (DBB) 306 that is pointing to a memory block 302A in the memory block SMO 304. Also as shown in FIG. 3, response SMO 312A includes one allocated response DBB 308 that is pointing to the same memory block 302A in the memory block SMO 304. Thus, the control region 202 and servant region 204A are sharing access to memory block 302A.

Though shown as separate blocks in FIG. 3, one or all of the request SMO 310 and the response SMOs 312 may be implemented as memory blocks 302 in the memory block SMO 304. In an embodiment, each memory block 302 is pointed to by at most one response DBB 308 from an SR 204 response SMO 312.

Figure 4:
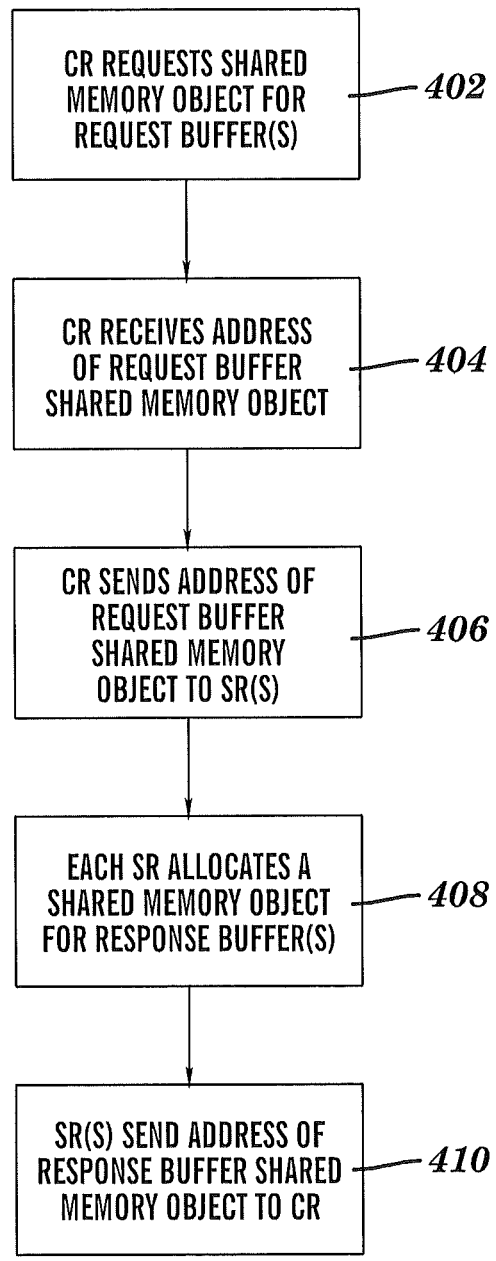
FIG. 4 illustrates a process flow for creating shared memory objects in accordance with an embodiment.

FIG. 4 illustrates a process flow for creating SMOs in accordance with an embodiment. In an embodiment, the process flow is executed on the application server 110. The process depicted in FIG. 4 assumes that the memory block SMO 304 has already been allocated. At block 402, a CR 202 requests a SMO (e.g., from an operating system) for storing a request buffer(s). The operating system allocates the requested SMO (typically in the order of megabytes of size) and, at block 404 the CR 202 receives the address of the SMO. Thus, a request SMO 310 is allocated and available for use by the CR 202. At block 406, the CR 202 sends the address of the request SMO 310 to each of the SRs 204 to identify the request SMO 310 as a shared address space in the SR 204. At block 408, each SR 204 allocates a SMO for use as a response SMO 312. The operating system allocates the requested SMO and, at block 410 each SR 204 sends the address of its response SMO 312 to the CR 202 to identify it as a shared address space in the CR 202.

Figure 5:
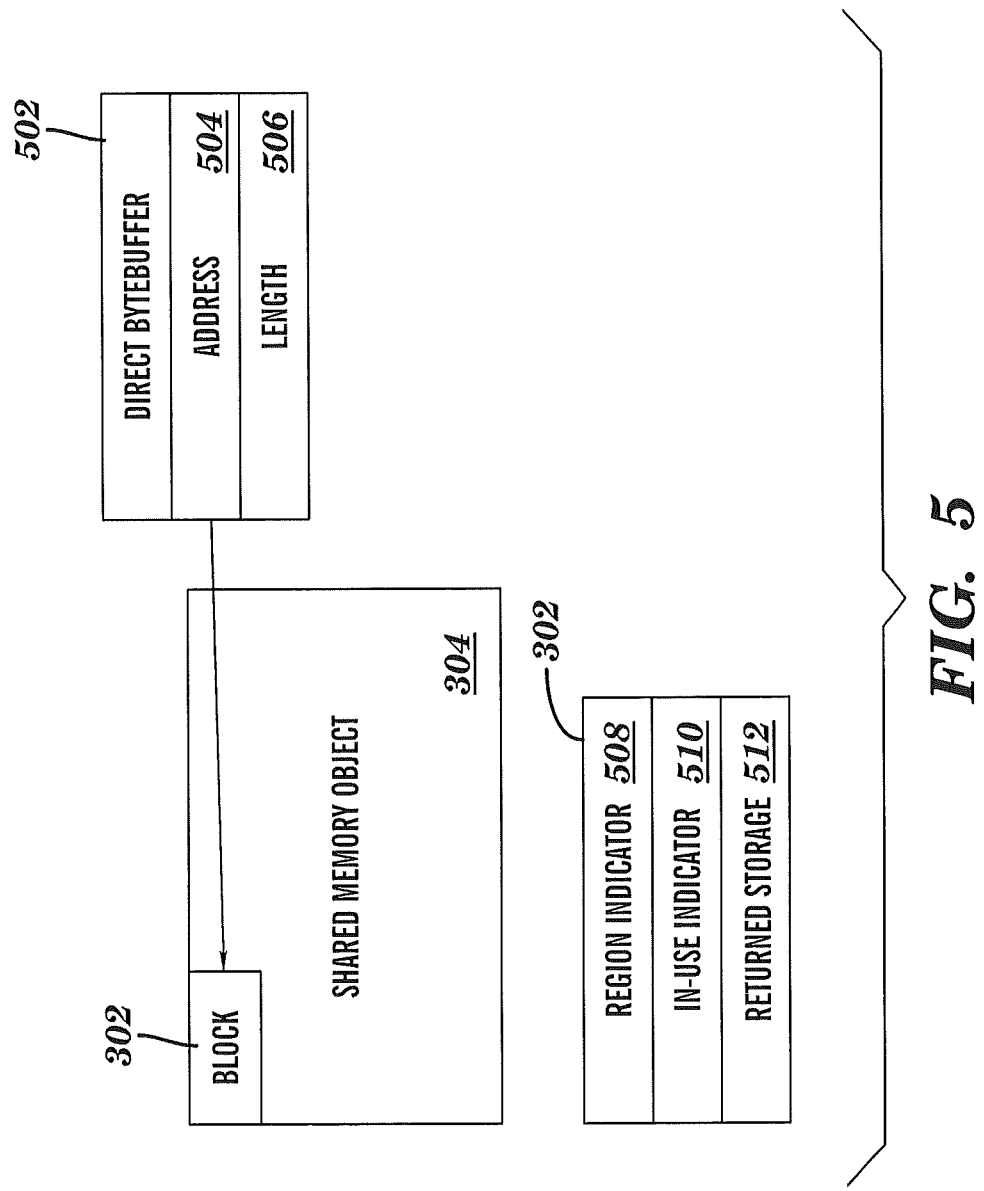
FIG. 5 illustrates contents of shared memory objects in accordance with an embodiment.

FIG. 5 illustrates contents of shared memory objects in accordance with an embodiment. The direct byte buffer 502 includes an address 504 and a length 506 (i.e., metadata about the memory block 302). The address 504 is the address of the memory block 302 in the memory block SMO 304, and the length 506 is the size of the memory block 302 (e.g., in number of cells, in number of pages, etc.). Thus, the direct byte buffer 502 contains metadata that points to the location of the memory block 302 in the memory block SMO 304 that contains the shared data. Also shown in FIG. 5 is an embodiment of a memory block 302 that includes header information (e.g., a region indicator 508 and an in-use indicator 510) and a returned storage 512. The region indicator 508 identifies which region (e.g., a CR, a SR) created the memory block 302, and the in-use indicator identifies whether a region is currently using the memory block 302. The returned storage 512 is the data portion of the memory block 302.

Figure 6:
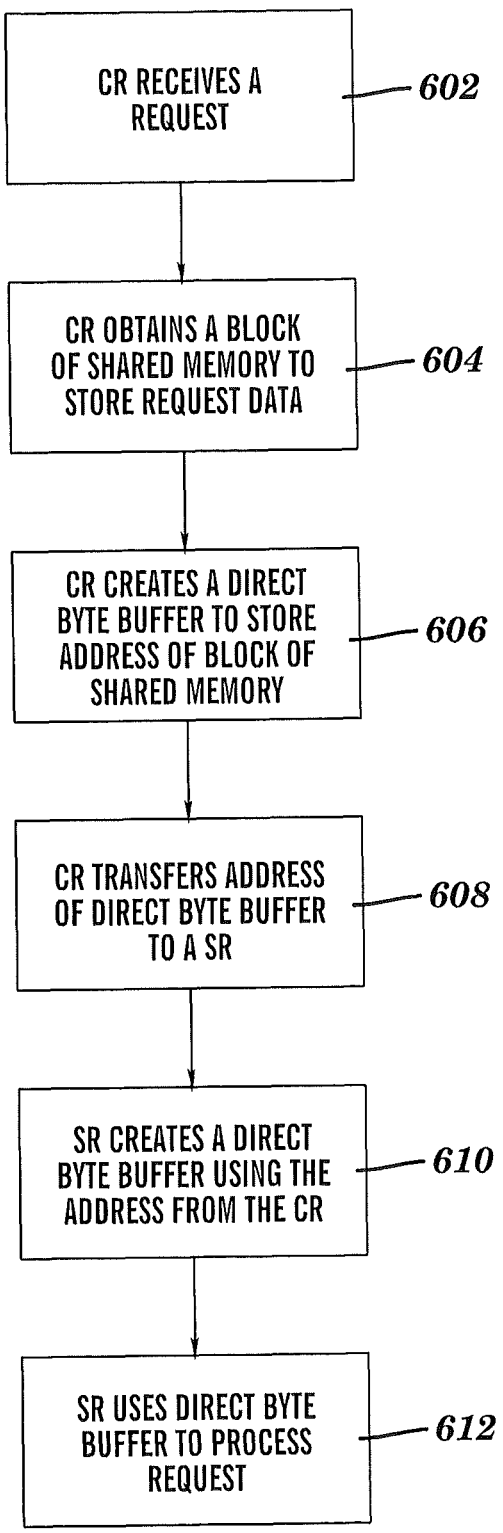
FIG. 6 illustrates a process flow for processing a request in accordance with an embodiment.

FIG. 6 illustrates a process flow for processing a request in accordance with an embodiment. At block 602, a request from a client application executing on a client system 104 is received at the application server 110 (e.g., a WebSphere application server) via the network 106 (e.g., a TCP/IP connection). At block 604, the CR 202 obtains a memory block 302 from the memory block SMO 304 to store the request data. At block 606, the CR 202 creates a request DBB 306 in the request SMO 310 to store the address of the memory block 302 that stores the request data. The new request DBB 306 is passed to the JVM of the CR 202 for any processing/routing required on the CR 202. At block 608, the CR 202 transfers the address of the request DBB 306 to the SR 204 that will be handling the request. By transferring the address of the request DBB 306 to SR 204, the CR 202 is notifying the SR 204 about the existence of the request data in the memory block 302. In an embodiment, a Java cross memory channel is used to transfer the address of the request DBB 306 to the SR 204. At block 610, the SR 204 reads the address of the request DBB 306 (e.g., the metadata) and creates a response DBB 308 to point to the address received from the CR 202. Thus, the response DBB 308 contains the address of the shared memory block 302. At block 612, the SR 204 uses the response DBB 308 to access and process the request.

Figure 7:
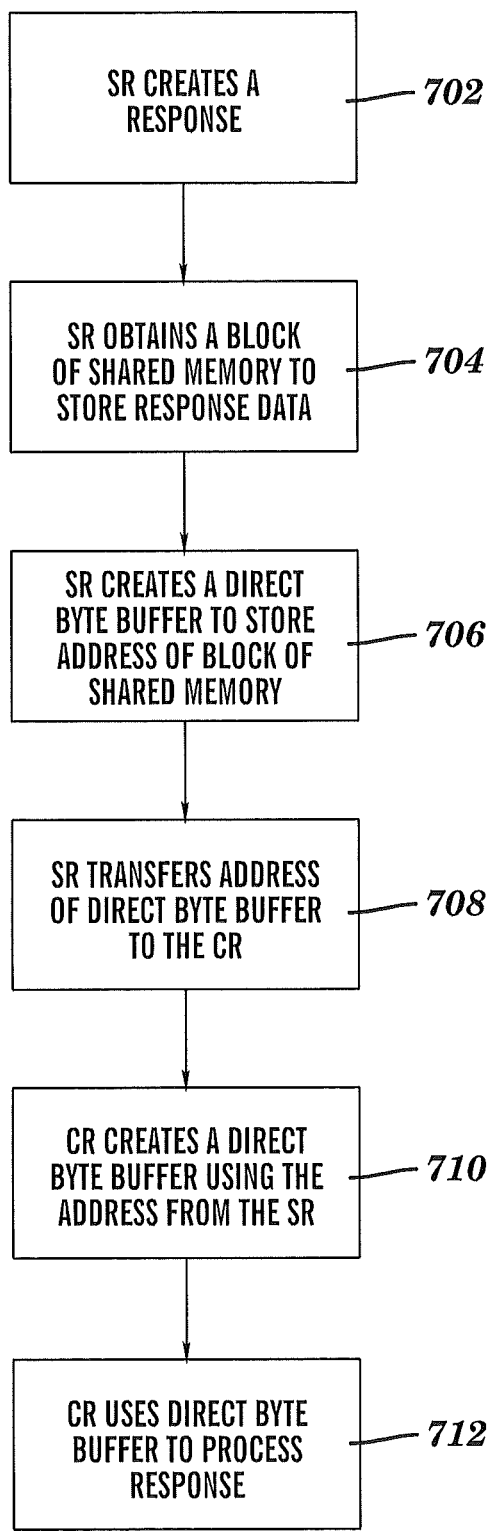
FIG. 7 illustrates a process flow for processing a response in accordance with an embodiment.

FIG. 7 illustrates a process flow for processing a response in accordance with an embodiment. At block 702, a SR 204 creates a response, and at block 704, the SR 204 obtains a memory block 302 from the memory block SMO 304 to store the response data. At block 706, the SR 204 creates a response DBB 308 in the response SMO 312 to store the address of the memory block 302 that stores the response data. At block 708, the SR 204 transfers the address of the response DBB 308 to the CR 202 that will be handling the request. By transferring the address of the response DBB 308 to the CR 202, the SR 204 is notifying the CR 202 about the existence of the response data in the memory block 302. At block 710, the CR 202 reads the address of the response DBB 308 (e.g., the metadata) and creates a request DBB 306 to point to the address received from the SR 204. At block 712, the CR 202 passes the request DBB 306 to the JVM executing on the CR 202 for processing.

Figure 8:
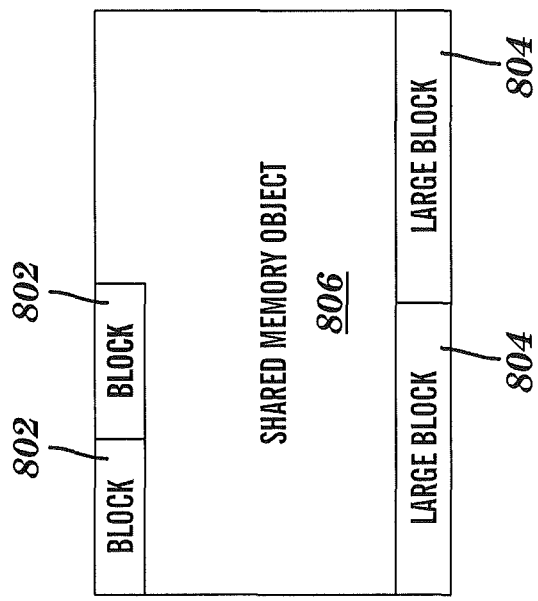
FIG. 8 illustrates contents of a shared memory object in accordance with an alternate embodiment.

FIG. 8 illustrates contents of a shared memory object in accordance with an alternate embodiment. As shown in FIG. 8, memory blocks 802, 804 in a memory block SMO 806 can vary in size.

In an embodiment, when a DBB is destroyed (or deleted), the header of the memory block 302 is checked. If the header indicates that the region that allocated the memory block 302 (as indicated by the region indicator 508) matches the current region and memory block is no longer in use by the shared address space (as indicated by the in-use indicator 510), then this memory block is released and managed in an embodiment by chaining and/or pooling code. If the memory block 302 is still in use, the memory block 302 is added to a "deleted" list to be checked the next time a delete occurs. If the header indicates the region allocated does not match the current region, the in-user indicator 510 for the memory block 302 is updated to indicate that the memory block 302 is no longer in use by the shared address space so that when the next delete occurs in the allocating region, the memory block 302 will be released.

In an embodiment, the memory blocks 302 and DBBs taken from the SMOs are pooled/chained upon release. Because of the nature of the usage of DBB, it is desirable for chains of unused blocks to be maintained for several common sizes of buffers (i.e., 1 k, 4 k, 8 k, 16 k, 32 k, etc.). For blocks that are larger than the largest common size, these blocks will not be pooled, however they will be returned directly to the SMO that they were obtained from. In an embodiment, each SMO contains a list of "next available blocks" as well as "remaining area" within the SMO. New blocks may be obtained from either one of these areas.

In the case of "large" requested blocks these are preferentially taken from the next available blocks from the smallest available block. If allocated from the remaining area, these are taken from the end of the remaining are rather than the front of the remaining area. They are taken from the end of the remaining area since large blocks are not pooled and thus, are more likely to be combinable with other areas when returned to the SMO. That is, when a large block is returned, the chain of "next available blocks" is checked to see if any existing block may be combined with the newly returned block.

Technical effects and benefits include avoiding the extra storage overhead of maintaining two copies of shared data. Additional benefits include avoiding the processing expense of copying the information.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of methods disclosed herein or to cause a computing device to perform the methods disclosed herein. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:
1. A method for sharing data between computer processes, the method comprising:
    executing a plurality of independent processes on an application server, the processes including a first process and a second process;

providing a shared memory for storing data, the shared memory utilized by the plurality of independent processes;

storing, in the shared memory, a single copy of the data and metadata, the metadata including an address of the data and the storing initiated by the first process;

transferring an address of the metadata from the first process to the second process to notify the second process about the data;

reading the metadata to determining the address of the data in the shared memory the reading by the second process; and accessing the data in the shared memory, the accessing by the second process.

2. The method of claim 1, wherein the metadata further includes a length of the data.

3. The method of claim 1, wherein the data identifies the first process as a creator of the data.

4. The method of claim 1, wherein the data identifies the second process as a user of the data.

5. The method of claim 1, wherein the data identifies a creator of the data and a user of the data that are utilized by the application server during a data deletion process.

6. The method of claim 1, wherein the first process is a Java control region and the second process is a Java servant region.

7. The method of claim 6, wherein the first process stores the address of the metadata in a first direct byte buffer in the control region and the second process stores the address of the metadata in a second direct byte buffer in the servant region.

8. The method of claim 6, wherein the method further comprises passing control to a Java virtual machine.

9. The method of claim 6, wherein the data includes a request and the method further comprises executing the request on the servant region.

* * * * *